United States Patent Office 3,117,057

Patented Jan. 7, 1964

1

2

3,117,057
DISINTEGRATABLE SPRAY GUN PELLETS

Francis H. Snyder, Newtown, Conn., assignor to Barco Manufacturing Co., Inc., Worcester, Mass., a corporation of Massachusetts No Drawing. Filed July 11, 1960, Ser. No. 41,755
2 Claims. (Cl. 167—42)

This invention relates to vegetation aiding pellets which are capable of being distintegrated by a stream of water in a spray gun and sprayed onto vegetation.

A suitable spray gun has an open ended barrel connected to a water hose line and within which the pellets are carried where they are gradually disintegrated or erroded and dissolved by the water passing through the barrel, and the chemical constituents ultmiately issue from the spray nozzle intermingled with the water spray. A spray apparatus or gun intended for this purpose is shown in the U.S. patent to Packard, 3,042,312 of July 3, 1962. The vegetation siding pellets may comprise a biocide and vegetation aiding ingredient and particularly an insecticide, fungicide, fertilizer, or other suitable chemical agent for application to trees, plants, garden and lawn to promote or aid their growth and preservation. Heretofore, a spray substance has been furnished as a large molded stick of material which substantially fills the diameter of the barrel, but this has not provided a uniform spraying action because of the small amount of surface area exposed to the passage of water and the gradual wearing away of the stick which exposes an ever decreasing area. Even more important is the fact that such a substance has been so constituted that water turns it into a mushy mass which is not readily soluble or distintegratable by the water, so that the spray issuing from the nozzle soon changes in its percentage content of the chemical to be applied to the vegetation.

The primary object of my invention is to provide a water distintegratable pellet for use in a spray gun which will distintegrate or dissolve at a sufficiently uniform rate to insure a comparatively long life of effective service.

Other objects are to provide a spray gun pellet of such composition and structure that it will disintegrate at a fairly uniform and controlled rate and which comprises a powder containing a chemical or active agent bound into pellet shape by an adhesive serving to bond the ingredients and to control the rate of distintegration of the pellet and the solution of the pellet active agent, which has the capability of deflocculating the material, and which provides a viscous or sticky substance capable of clinging to foliage that is being wet by the water spray.

A further object is to provide a composition and structure for pellets which satisfy the above conditions and have a controlled slow rate of distintegration by a stream of water.

Other objects will be apparent in the following disclosure.

Various chemical substances, herein termed biocidal, are capable of use in a spray gun for application to vegetation. These comprise such active agents as are sold under the trademarks of "Chlordane" (octachloro-4-7 methanotetrahydroindane, "Malathion (o-O-dimethyl dithiophosphate of diethylmercapto-succinate), "Captan" (n-trichlorophthalimide), and "Methoxyclor" (2,2-bis (p-methoxyphenyl) I-trichloroethane), as well as fertilizers and various other compositions which are suitable for plant life or inimicable to insects and fungi. These are ordinarily powders or crystalline substances containing inert materials and active agents of limited solubility and, except in the case of the fertilizer, they may require a viscous substance to hold the active agent in contact with vegetation for a considerable period of time to allow it to become more effective. A fertilizer is somewhat biocidal but its primary purpose is to stimulate vegetation growth through the root structure and it should not adhere to the plant leaves.

In accordance with my invention, I bond in pellet form such water soluble and disintegratable solid substances comprising inert materials and fungicides, insecticides, fertilizers, or other substances, herein termed an "active biocidal and vegetation aiding agent" capable of use in a water spray gun. For the bonding material I employ a detergent capable of forming an adhesive film coating on the dry active agent powders and providing a coherent body in pellet form. The detergent is such as will adhere to and bond the substances. It will resist and control the rate of disintegration of the pellet by a water stream for a considerable time, and it will serve both as a wetting agent and a deflocculating agent for presenting the active material in a finely divided condition capable of adhering to foliage. The bonding detergent is also required to prevent a too rapid disintegration or solution under the impelling force of the water passing through the gun.

Of the detergents capable of satisfying these requirements, I prefer the type comprising a mixture of alkyl aryl sulfonates, such as the alkyl benzene sulfonates, in which the substituent alkyl group corresponds to aliphatic and alicyclic hydrocarbons of a kerosene fraction of petroleum which boils largely above 100° C. and primarily within the range of 210° C. to 320° C., such as are described in the U.S. patents to Flett, Nos. 2,223,364, 2,233,408, 2,247,365, 2,283,199 and 2,397,133. A suitable bonding detergent is sodium alkyl benzene sulfonate, in which the alkyl group has at least 10 carbon atoms and preferably 12 to 30 per molecule.

The detergent formed of mixed alkyl aryl sulfonates, herein termed a "bonding detergent" to avoid repetitious chemical names, serves satisfactorily in the product and process herein described as a bonding medium to hold in pellet form the selected powdered fungicide, insecticide or fertilizer and associated inert ingredients. It serves not only as an adhesive bond but also as a wetting agent capable of cleaning a surface and causing adhesion thereto of the active agent, and it causes dispersion and deflocculation of the pellet material, so that the latter may be taken up by or dissolved in the stream of water passing through the spray gun. This bonding detergent primarily controls the disintegration of the pellet, so that there is only a slow decomposition of the pellet in the water stream with a resultant long life of useful service.

The dry chemical and inert ingredients of suitable nature, and which may be widely varied, are mixed with the bonding detergent in water solution, the water and sulfonate contents being controlled to provide a moldable pellet. The inert grains serve to provide form to the pellet and to hold the water soluble agent therein. Hence, the inert grains of powder are important in their function of maintaining the pellet shape until a major proportion of the active agent has dissolved. This mixing is preferably effected by spraying an aqueous solution of the bonding detergent onto a moving mass of the powder, so as to insure a uniform wetting of the grains. This surface wetting of the powder by the adhesive causes cohesion in the molding operation.

The aqueous solution of bonding detergent is added to the dry powders within limited proportions. I have found that if too little is employed, the pellets subsequently made therefrom distintegrate too freely and do not have a long life of useful service. If the bonding detergent constitutes less than about 8% by weight of the total composition, the pellet rapidly becomes mushy in the water and does not remain in the pellet form as is required for controlling the disintegration. For example, it is desirable that 3.5 to 4.5 gallons of water pass through a charge of 4 ounces of highly soluble fertilizer pellets before the active material has fully dissolved. When the bonding detergent is increased above 8% by weight of the pellet mass, water disintegration of the pellet increases with the increase of the binder, and the tendency towards its becoming mushy decreases. At 9%, there is a low rate of solution of the active agent, but from 12½ to 15% by weight of the bonding detergent the solution rate is high enough to give the best spraying conditions and yet permit the pellet to retain its shape and disintegrate only slowly and at a satisfactory rate. An upper limit of the bonding detergent may be specified as 15%, and there is no advantage to be had in using a larger quantity.

The quantities of the bonding detergent and the active agent powder are controlled primarily to give a satisfactory rate of disintegration in the water stream to provide sufficient chemical per ballon of water in the spray. For the insecticides and fungicides of the types specified, it is usually desirable that each 100 gallons of water dissolve about 2½ lbs. of active agent. The preferred composition of the active agent ordinarily is held within the limits of 2 lbs. 2 oz. as a minimum to 2 lbs. 11 oz. as a maximum for each 100 gallons of water in the spray. This amounts to about 2 tablespoons of solid active agent per gallon of water.

A further consideration involves that of controlling the water content of the bonding detergent composition. If there is insufficient water present, the pellet material will remain powdery and not extrude properly in the molding operation. Too much water will, of course, make a too soft mass. It is accordingly desirable to control the water carefully and sometimes to the extent of determining the humidity of the atmosphere and calculating that into the water content. I prefer that the water content be from 9½ to 10½% by weight of the quantity of bonding detergent solution. This controls the percentage of water in the pellet and therefore its moldability.

While the composition may be widely varied according to the intended use of the pellet material, a composition of general purpose which may be used for the control of both insects and fungus may comprise the following materials, in which the powders have been previously brought to approximately a 200 mesh size:

32 lbs., 50% "Methoxychlor" powder (which may contain calcium carbonate, diatomaceous earth or various other inorganic insoluble fillers)
27 lbs., 25% "Malathion" wettable powder
27 lbs., 50% "Captan" wettable powder In the table, the percentage figure refers to the approximate proportion of active chemical material, the remainder being inert insofar as its effective activity is concerned. Also, in this composition, the non-active portion of the granular material constitutes over 50% or a substantial portion of the powder, and it is this inert substance which aids in maintaining the pellet shape while the soluble agents dissolve during the water distintegrating action.

These powders are mixed dry in a suitable mixing apparatus. In a separate container, I dissolve the selected bonding detergent, such as sodium dodecyl benzene sulfonate, in water in the following proportions:

9 lbs. of the sulfonate which is substantially free from $Na_2SO_4$,
3½ lbs. of a crude grade of the same bonding detergent containing 60% of $Na_2SO_4$,
10 lbs. plus or minus ½ lb. of water.

The above composition contains 86 lbs. of active agent powder, including the inert materials, 1½ lbs. of water and 12½ lbs. of dry bonding detergent per 100 lbs. of final product to be molded as pellets.

In the preferred procedure, the active agent is employed in a finely divided condition, such as will pass through screens of 100 to 200 meshes per linear inch so as to insure a satisfactory coating by the bonding detergent. The solution of bonding detergent is heated to about 70 to 80° C. and then sprayed onto the finely divided dry powder of active material as the latter is being tumbled in a ribbon blender. This serves to coat the freely flowing powdered ingredients with the aqueous bonding detergent solution. The powder issues from the blender as a thin stream of flowing material, wherein the wetted mass tends to remain as small balls or globules somewhat of the type of spherical birdshot. There is insufficient water present to dissolve much of the active agent and this solution becomes a part of the bond. Also, the spherical globules which are accompanied by some dust contain water in too small an amount to make a gooey paste but enough to cause the substance to cohere and extrude properly through an extrusion apparatus of the type used for meat chopping. The extruder disk may have holes of about $\frac{3}{16}$ or ¼ inch diameter which form long cylindrical bodies that break into elongated cylindrical pellet shapes as they issue from the extrusion plate. It is preferred that the smallest dimension of the pellet be not over about ½ inch so that the surface area of the pellets be large for a given mass. As above stated, the water content is controlled to insure that this material will extrude and break off as it issues from the extruding head into pellets of a desired size.

The material issuing from the extruder tends to break off as cylinders having lengths about twice their diameters, such as about ¼" diameter by ½" length, which is a preferred size because it presents a suitable surface area for contact with the water passing through the spray gun. The pellets may also be made horseshoe shaped or annular, by providing the extrusion plate with mandrels supported in the plate orifices, so as to present a larger surface for water contact. Although the pellet decreases in size during use in the gun, the surface area of the pellet of the preferred small size does not vary enough to affect the solubility and disintegration rate materially. It is desired that the pellet remain in a substantially solid condition during a long period of use and not form a substance which mushes down into a large mass of material which has but little surface area for water contact.

Since the pellets may have broken and cracked ends and surfaces, and the microscopic and larger sized cracks in the pellet surface tend to admit water by capillarity and thus to cause a too rapid disintegration, it is desirable to densify them to eliminate cracks as much as possbile and provide a substantially smooth surface and therefore a better and controlled disintegration rate. I prefer to densify the extruded pellets by drying and tumbling the same. To this end, the pellets, after coming from the extruder, are cooled rapidly by contact with the atmosphere or they may be dried with the aid of heat so as to remove water. Thereafter, the pellets are placed in a cylindrical drum equipped with inner flanges to aid in lifting the pellets as the drum is rotated slowly, such as 50 or 60 r.p.m. This rotation of the tumbling drum causes the pellets to roll against each other and to fall through short distances. The tumbling and rolling action serves to break the larger pieces into shorter lengths. Primarily, the tumbling impacts tend to close up the cracks and to polish the surface and to round the ends of the pellets. This tumbling action may be allowed to take place for a sufficient length of time, such as from 6 to 15 and preferably 11 or 12 minutes, which is found adequate for densifying the pellet body. Cool air may be blown through the drum during the tumbling operation. I have found that if the pellet is not thus densified by tumbling and rolling, its solution rate may be as much as twice that of the densified pellet, so that the pellet will disintegrate and dissolve too rapidly for many purposes. Also, the pellet that has not been densified may have a chalky or cracked surface which increases the disintegration effect. The pellets may then be placed in shallow layers in trays and subjected to a gentle drying heat and preferably well below the point of steam formation. The temperature is held preferably at 110 to 120° F. until the pellet moisture content is not over 1.5%, more or less. This step is to prevent subsequent adhesion of the pellets during storage, and the drying conditions may be varied within that requirement.

If a fertilizer is to be put into pellet shape, the bonding detergent may be incorporated with it according to the above procedure, but ordinarily less than 1% of water is added to make the pellet sufficiently plastic or moldable. If methyl cellulose powder is incorporated, the heat of extrusion when the pellet is formed tends to melt the methyl cellulose partially, but it later hardens in the air and aids in maintaining the pellet shape. The pellet may be sufficiently dried by means of a fan blowing air against the material as it issues from the extruder without the use of further drying heat. Thereafter, tumbling the pellets tends to densify them and leave the material in the right condition for a slow rate of dissolving in the water spray.

It should be explained that the aqueous solution of detergent, such as the alkyl aryl benzene sulfonate, forms a pellet substance which is almost insoluble in quiet water due to the bonding detergent film which has gathered on the surfaces of the pellet and its grains. However, when water is forcibly driven through the spray tube, it tends to disturb that film or to sweep it away, so that the pellet material may disintegrate. In quiet water there is no substantial degree of diffusion of the active pellet ingredient through the viscous film of the bonding detergent. But diffusion does take place at a sufficiently rapid rate when the film is disturbed by the violent flow of water therepast.

As an example of a fertilizer having 15% each of total nitrogen, potassium oxide and monoammonium phosphate as active agents, the remaining portion of 55% may consist of 24% by weight of inert components of the fertilizer, 9% of diatomaceous earth and other materials, 19.25% of the aqueous solution of the bonding detergent, 0.25% of methyl cellulose and a maximum water content of 2.5%. This fertilizer may be bonded according to the procedure employed for the insecticides, etc. Similarly, a pellet of "Chlordane" may have about 42% of the active chemical, the remaining 58% being diatomaceous earth and other inert ingredients, including about 9% of the aqueous solution composed of the bonding detergent. The multipurpose insecticide and fungicide pellet may have 32.5% by weight of the active ingredients and 67.5% of inerts, such as diatomaceous earth, and including 10% of the bonding detergent solution.

It will now be appreciated that various modifications may be made both in the compositions and in the method of manufacture. Hence, the above disclosure is to be interpreted as setting forth my preferred practice as well as the principles underlying the invention, and this disclosure is not to be interpreted as imposing unnecessary limitations on the appended claims.

I claim:

1. A water spray gun disintegratable pellet comprising a water disintegratable extruded body of dry, finely divided, inert, granular material interspersed with a dry, finely divided material containing a water soluble active biocidal and vegetation aiding agent, and bonding detergent coatings on said materials formed of an aqueous solution of an alkyl aryl sulfonate having from 10 to 30 carbon atoms per molecule, said materials being bonded by said detergent coating as a coherent pellet body having its smallest dimension not over 0.5 inch, said inert granular material constituting at least 50% by weight of the pellet and serving to maintain the pellet shape until a major proportion of the active agent has been dissolved, and said bonding detergent constituting from 9 to 15% by weight of the pellet mass and serving as a wettable deflocculating film on the pellet grains which minimizes the rate of disintegration of the pellet and solution of said agent in still water but which breaks down in a turbulent water flow and provides a controlled rate of pellet disintegration, said pellet having the low density and porosity provided by extrusion of a wet coherent mass of said granular materials coated and bonded by an aqueous film of said detergent.

2. A pellet according to claim 1 in which the surfaces of an extruded pellet mass are densified and smooth and substantially free from water admitting surface cracks and wherein the detergent constitutes from 12.5 to 15% by weight of the pellet mass and the active agent is proportioned in a mass of the pellets in a spray gun within the limits of 2 pounds, 2 ounces and 2 pounds 11 ounces for solution in each 100 gallons of turbulent water passing through the gun.

References Cited in the file of this patent

UNITED STATES PATENTS

| | | |
|---|---|---|
| 2,375,095 | Flett | May 1, 1945 |
| 2,607,738 | Hardy | Aug. 19, 1952 |
| 2,614,917 | Zukel et al. | Oct. 21, 1952 |
| 2,768,095 | Tadema et al. | Oct. 23, 1956 |
| 2,779,670 | Burkett | Jan. 29, 1957 |
| 2,870,059 | Williams et al. | Jan. 20, 1959 |
| 2,875,155 | Miles | Feb. 24, 1959 |
| 2,948,655 | Flenner | Aug. 9, 1960 |
| 2,992,090 | Littler | July 11, 1961 |
| 3,034,858 | Vives | May 15, 1962 |

OTHER REFERENCES

McCutcheon (Surfactants Listed) 4th rev. of Syn. Detergents and Emulsifiers, Part III, pub. in Soap and Chemical Specialties 34:2, Feb. 1958, pp. 49, 63. 64 and 70.